Aug. 6, 1929.  F. S. WATTELLS  1,723,222
SPEED INDICATOR SIGNAL
Filed Jan. 31, 1924  3 Sheets-Sheet 1

Witnesses:
W. P. Kilroy
Harry R. L. White

Inventor:
Frank S. Wattells
By Alice & Alice
Attys.

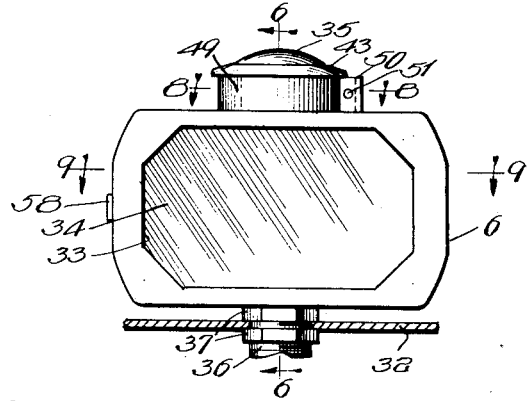
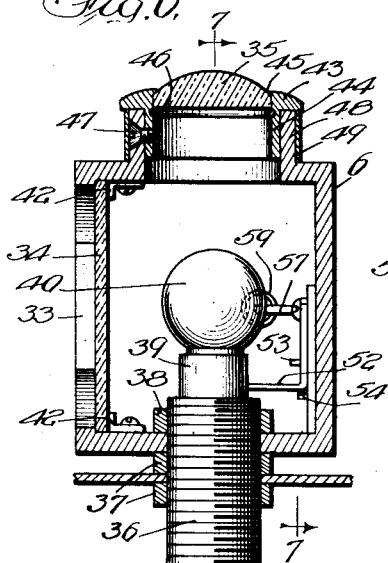
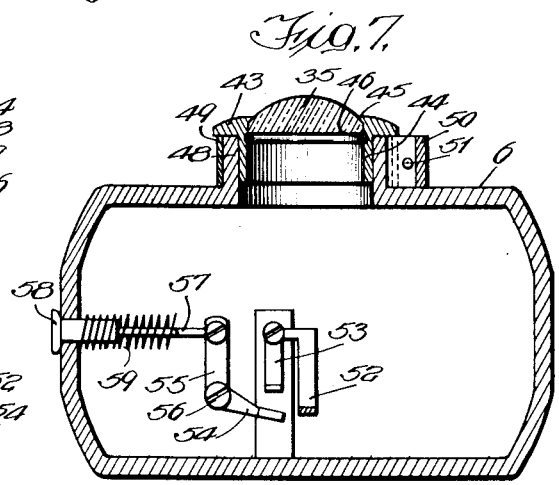
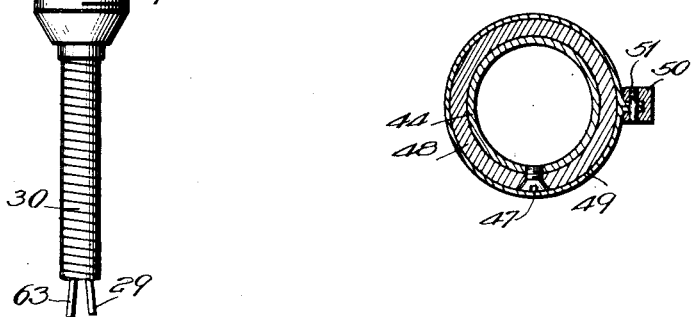

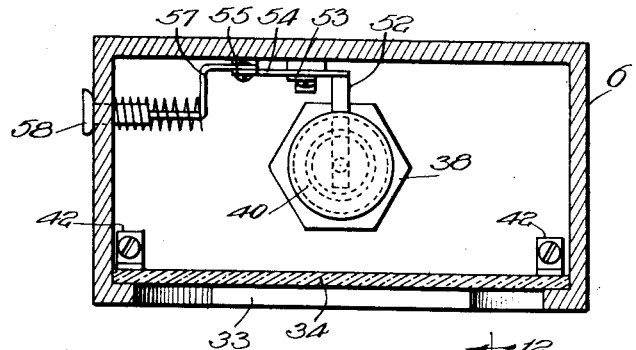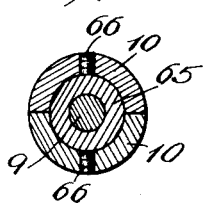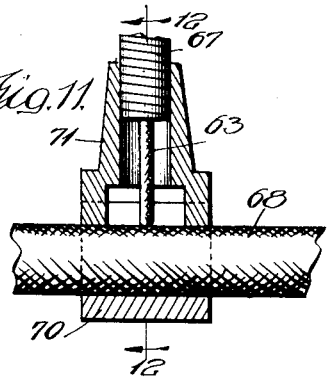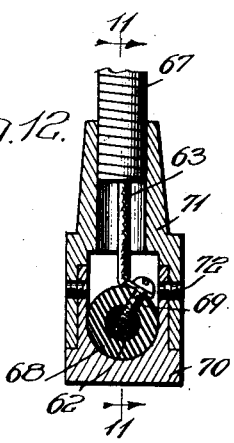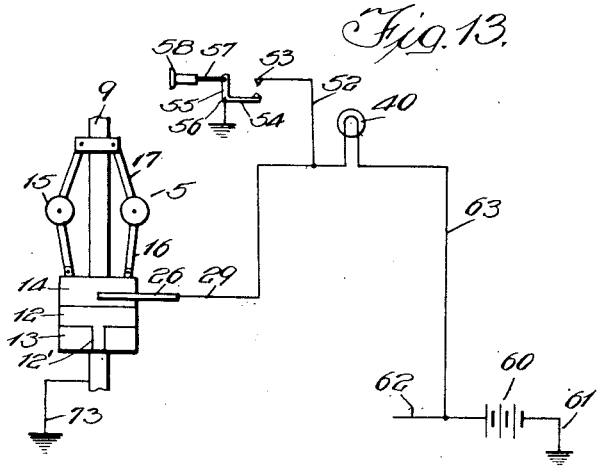

Patented Aug. 6, 1929.

1,723,222

UNITED STATES PATENT OFFICE.

FRANK S. WATTELLS, OF CHICAGO, ILLINOIS, ASSIGNOR OF ONE-HALF TO JULIUS REYNOLDS KLINE, OF CHICAGO, ILLINOIS.

SPEED-INDICATOR SIGNAL.

Application filed January 31, 1924. Serial No. 689,741.

My invention belongs to that general class of devices known as signals, and relates more particularly to a signal for vehicles which will give an indication or signal to a traffic officer, pedestrian or the like when the vehicle exceeds a legal speed. The same is particularly adapted for automobile use, especially in cities, where there is considerable traffic and congestion, and where the recklessness of one driver may imperil hundreds of others. Generally speaking, it is difficult for the authorities, particularly the officer on foot, to accurately determine whether or not the motorist has exceeded the speed limits and a reckless one may go unpunished or a law-abiding motorist be prosecuted, when, as a matter of fact, he was within the limit allowed. The present invention has among its objects the production of a device of the kind described, which will be simple, durable, compact, convenient, attractive, reliable, efficient and satisfactory for use wherever found applicable. More particularly it has as an object the production of a device of the kind described that can not be tampered with so as to affect its accuracy, which may be tested at any time by a traffic officer to assure him that it is in operative working condition, and which is of such accuracy that it may be considered as legal proof and be relied upon by the authorities that the motorist was or was not violating the law. The same, therefore, is a protection and an assurance to the low-abiding motorist and citizen that he will not be wrongfully charged with speeding, and that the lawless and reckless motorist will be properly punished. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a view of a portion of an automobile with my device applied thereto;

Fig. 5 is a front elevation of my improved signal device;

Fig. 6 is a sectional view taken substantially on line 6—6 of Fig. 5;

Fig. 7 is a sectional view taken substantially on line 7—7 of Fig. 6;

Fig. 8 is a sectional view taken substantially on line 8—8 of Fig. 5;

Fig. 9 is a sectional view taken substantially on line 9—9 of Fig. 5;

Fig. 10 is a sectional view taken substantially on line 10—10 of Fig. 2;

Fig. 11 is a sectional view illustrating the method of locking the electrical connection to my instrument onto one of the battery cables;

Fig. 12 is a sectional view taken substantially on line 12—12 of Fig. 11; and

Fig. 13 is a diagrammatic view illustrating one method of wiring up the apparatus to produce the desired results.

Figure 1:
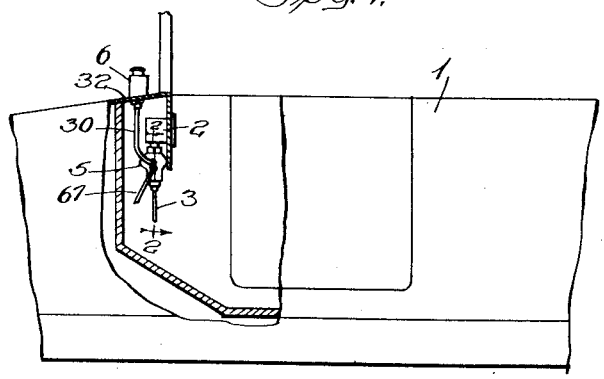

It may be mentioned that my device may be so designed as to indicate or signal by the operation of a visible, audible or equivalent mechanism, the visible mechanism, however, being generally preferred and illustrated in the drawings.

Referring to the drawings, 1 represents an automobile of any style or type and 2 the usual speedometer attached thereon and connected to a moving part of the vehicle to transmit movement and indicate speed, an enclosed shaft 3 being generally employed which extends from the speedometer to a driving part. I prefer to arrange an automatic switch mechanism 5 between the speedometer and its source of power so that operation of the vehicle and of the speedometer will also cause an operation of my device. My device is electrically or otherwise connected with the signaling apparatus, which in the illustrations consists of a lamp 6 mounted on the vehicle at any suitable point, preferably on the cowl just in front of the windshield so that it may be viewed and be clearly seen by a traffic officer or pedestrian regardless of where they may stand, or by other motorists.

Figure 2:
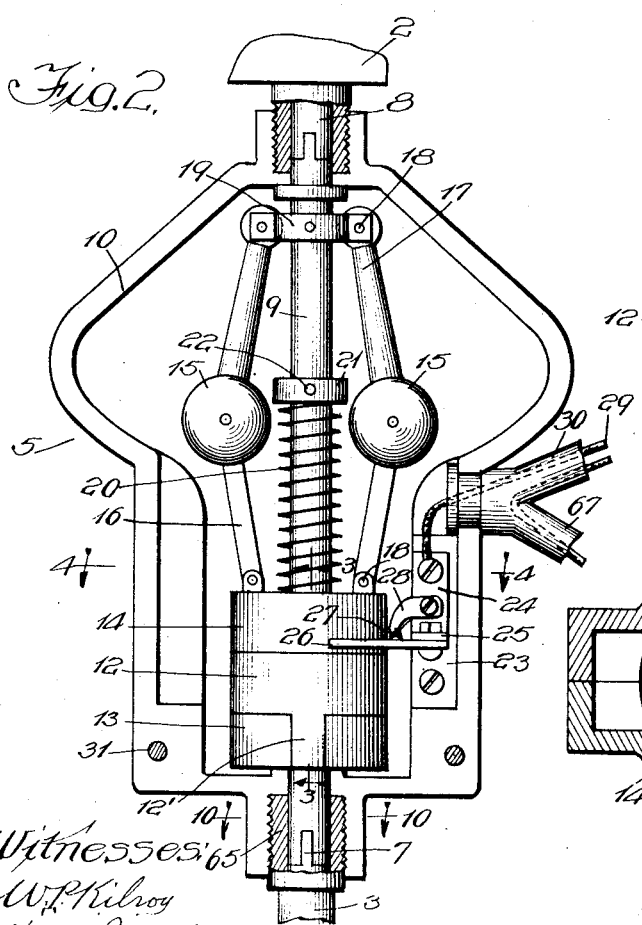
Fig. 2 is a sectional view through my improved automatically operable switch.
Figure 3:
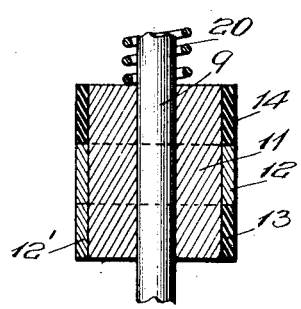
Fig. 3 is a sectional view taken substantially on line 3—3 of Fig. 2.

Referring to Fig. 2, 7 represents the speedometer drive shaft from a moving part of the vehicle and which ordinarily is connected directly to the shaft 8, forming part of the speedometer. With my apparatus, however, I arrange an intermediate shaft 9 between the shafts 7 and 8 so that the drive from the shaft 7 is through shaft 9 to shaft 8. There is provided a casing or enclosure 10 surrounding the shaft 9 and so connected to the housing or covering of the shafts 7 and 8 that access to the casing and parts contained therein is ordinarily impossible, at least secret access and change will be practically so. That is to say, the casing can only be opened up by the use of tools in the hands of an expert mechanic, and the parts manipulated to calibrate or change the adjustments. The housing shown is in two parts suitably secured together in any preferred manner, as for example, by screws 31 which are broken off or finished flush at the exterior of the casing and so that they can only be removed by burning or drilling them out or the like.

Arranged on the shaft 9 and movable thereon is a member 11 which is provided with a conducting face 12. I have shown the part 11 of metal with the collar 12 in contact therewith forming a ground, and provided with rings 13 and 14 of insulated material. I have shown contact 12 provided with an extending part 12', the purpose of which will be hereafter explained. The member 11 is controlled and moved on the shaft 9 by means of the governor balls 15 connected by the links 16 and 17 to the member 11 at 18 to collar 19; also at point 18 on the collar, the collar being ordinarily secured to the shaft by pinning or otherwise. The spring 20 arranged between member 11 and the collar 22 also secured to the shaft, also controls the movement of the member 11 and tends to return the same to the position shown in Fig. 2. When shaft 9 is rotated by the moving vehicle, the balls 17 and parts also rotate therewith, and as the speed increases, the centrifugal action tends to throw the balls outwardly, and these through the link mechanism shown raise member 11. As the speed decreases the balls tend to drop, returning member 11 to an inoperative position, this also being returned by the spring 20 which has normally opposed the raising of member 11.

Figure 4:
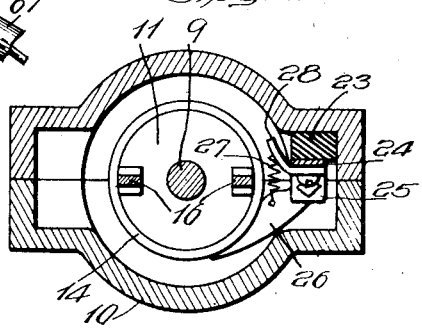
Fig. 4 is a sectional view taken substantially on line 4—4 of Fig. 2.

Arranged within the housing is an insulated block 23 or the equivalent which carries the member 24 provided with an extending flange 25. A commutator brush 26 is adjustably carried by the flange 25 and normally maintained in contact with the face of the insulating rings 13 and 14 or contact members 12 by a spring 27 secured to the brush 26 and to some suitable fixed support, as for example, the arm 28. As will be obvious by referring to Figs. 2 and 4, the brush has considerable area as well as thickness of material and consequently will wear for a considerable time before requiring replacement. It is also so constructed that it will notwithstanding wear, at all times closely fit and contact on the face of the movable member 11. The member 12 is grounded either through the mechanism or by an independent conductor not shown, except in the diagrammatic sketch in Fig. 13. The member 24, which is in electrical contact with the brush 26, is connected with the conductor 29 which extends to the signal device. When the brush is in contact with member 12, the circuit is closed continuously, while when the member 11 is raised sufficiently to cause the brush to contact with 13 and 12', the circuit is made and broken.

The signal device, as previously mentioned, consists of a lamp signal so constructed that it cannot be easily tampered with and which may be tested from time to time as an assurance that it is operative. As shown, the lamp casing 6 is mounted on the cowl 32 of the automobile, it being understood that 32 represents any suitable support. The lamp shown is provided with an opening 33 normally covered by a glass front 34 or the like, and there is also provided an opening at the top normally covered by a lens or glass cover 35, so that the driver or any one beside the car can see whether or not the speed limit is being exceeded. The armored covering 30 containing the conductor 39 is secured to the member 36 which is locked in place on the cowl and to the casing containing the lamp 40 by the lock nuts 37 and 38, or equivalent means for the purpose. Arranged at the end of 36 at the exterior of the lamp housing is a socket 39, in which the lamp 40 is mounted in the usual manner. As shown, the front glass cover 34 is secured in place by the brackets 42 which may be only removable from the interior or by breaking the glass. Obviously, the breaking of the glass would indicate tampering.

The lens 35 is mounted in a cap 43 which is provided with an extending part 44 adapted to extend into the flange 48 on the casing, a rim 45 and ring 46 maintaining the lens in place. Access to the interior of the lamp housing may be had by removing the cap 43. As shown, however, cap 43 is normally locked in place by a screw 47, the head of which is covered by a steel band 49 or the equivalent, which is locked in place by the member 50 and the flush bolt 51, which is broken off after seating. 50 and 51 may represent any style of seal or securing means which may be applied by an authorized party. Tampering with this by one other than the authorized agent will be apparent, particularly if a seal of soft metal is employed in the well known manner.

In order to test whether or not the lamp is burned out or the device is properly connected up and operative, I have provided an auxiliary mechanism operable from the out-side of the casing, whereby a traffic officer or other person may readily test the same. As shown, 52 represents a contact member insulated from the casing and which is connected with the lamp base or part of the circuit, adapted to short the lamp and cause it to be lighted when the button 58 is pulled out. As shown, 54—55 represents a bell crank switch member, pivotally supported at 56 and adapted to contact with the switch member 53. One arm 55 of the bell crank is connected by a rod 57 with the button, 59 being a spring tending to normally open the switch so that normally it is inoperative. This also tends to pull the button back or retrieve it.

I have shown in Fig. 13 how the device may be electrically connected up. Referring to this figure, 60 represents the battery which is ordinarily grounded, as indicated at 61, at one side, the opposite side 62 extending to the electrical apparatus which is also grounded at one side. I have shown my apparatus tapped onto the conductor 62 by conductor 63 which is connected with the lamp 40, and this through the conductor 29 with the brush 26 previously described. The switch member 52 is connected with 29 so that when the switch is closed the lamp 40 will be lighted. I have shown in Figs. 11 and 12 a simple yet effective method of connecting the conductor 63 with the conductor 62. Referring to these figures, 68 represents the insulation or covering over the conductor 62, and 69 a pin which is screwed in to engage and contact with the conductor. To this screw the conductor 62 is connected. The conduit 67 is attached and secured to a member 71 arranged to clamp over member 70 mounted on the conductor. As shown, two clamping members are secured together by means of the screw 72 which are preferably broken or finished off flush so that they cannot be easily removed. I have illustrated also in Fig. 10 how the member 65 at the end of the covering for the shaft 7 may be secured to the casing 10 by the screws 66, the same being finished off flush so as to prevent their removal.

Assuming that the apparatus is arranged as shown and described, when the vehicle is traveling at such speed that the balls 15 are not thrown out by the centrifugal force sufficiently to raise the member 11 and bring contact 12 in contact with the brush 26, there will be no signal displayed. As the speed is increased, the balls tend to move out, raising member 11 until at the speed for which the device is calibrated or set, for example twenty-five miles an hour, a circuit will be closed between 26 and 12, causing the lamp to be lighted and indicating that the speed is greater than twenty-five miles an hour. As the speed is further increased, member 11 is further raised until finally the same is raised sufficiently so that the brush 26 contacts alternately with 13 and 12' and every time 12' contacts with the brush there will be an intermittent flash. For illustration, the intermittent flash may indicate that the vehicle is traveling thirty-five miles or more an hour. These speeds of twenty-five and thirty-five miles per hour are merely illustrative, it being understood that the device may be calibrated or adjusted for any desired speeds. Likewise, it will be obvious that the intermittent flashing may be employed to indicate the intermediate speeds and the continuous flash the higher speeds. This may be accomplished by merely reversing members 12—12' and 13 on the member 11.

It will thus be seen that I have provided an apparatus which is not only simple, but which is reliable and which cannot be tampered with without danger of discovery by a designing lawless driver. Generally in making up the apparatus, I prefer to case-harden the parts, or at least the fastening means such as the bolts or screws, so that the apparatus cannot be tampered with except by use of an acetylene torch or such other apparatus or tools not generally at hand or easy to secure. When so case-hardened, it is not easy, if not impossible, to drill the parts or cut them to permit access to the mechanism. As the driver passes over the streets, if he is within the law, there will be no indication other than the negative indication, to-wit, the lamp not being lighted. If he reaches and passes the maximum speed allowed, or an excessively high speed, the signal will be flashed through the front and also in the top through the lens 35. Any officer, pedestrian or other observer will know from a distance that the speed limit is being exceeded. The apparatus is a safeguard to the law-abiding motorist, as if his apparatus is found to be in proper working order and no signal was flashed, he has ample evidence of compliance with the law. With the lawless driver, the evidence is plain that he has been speeding, which can only be offset by showing that his apparatus was out of order, in which case he may be penalized for not keeping the same in proper order.

The device is of considerable value in cases where automobiles are stolen, for purposes of bank or other robberies as in making their getaway the criminals running at high speed, attract the attention of all people along the road, thereby making escape more difficult. The same is also particularly desirable for taxicab companies as the same will make the drivers less apt to speed, thereby reducing accidents, and, in the event of speeding, will tend to cause detection of the drivers. The apparatus, as mentioned, is particularly desirable at this time, when all municipalities are endeavoring to discover a way to compel compliance with the laws and ordinances regulating permissible speeds. Obviously, an audible signal, such as an electrically operated horn, bell or the like may be employed in lieu of the lamp, or in combination therewith.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In an electric controller, a housing provided with aligned openings at either end, a shaft arranged within said housing and arranged for engagement with cooperating shaft parts projected into the housing through said openings, a contact member slidably mounted on said shaft, adjustable means for yieldably opposing the movement of said member on said shaft, means on said shaft for controlling the position of the contact member on the shaft for varying speeds of the shaft, said contact member provided with a band of conducting material having a laterally projecting part lying parallel with the shaft, said band and part constituting continuous and intermittent conducting means, a brush pivotally supported within the housing and insulated therefrom and constructed to fit said ring of conducting material and said projecting part, and means for yieldably maintaining said contact member in contact with said movable contact member, whereby sliding movement of the member on the shaft will cause continuous or intermittent closing of the circuit.

2. In a signaling member, a driven shaft, a movable member on the shaft, spaced non-conductive rings on the movable member, a conductive ring between the first rings, an extension on the conductive ring extending parallel with the shaft across one of the first rings, a brush normally contacting one of the first rings, means responsive to the speed of the vehicle for moving said movable member along the shaft and bring the conductive ring into engagement with the brush when the vehicle is traveling at a predetermined rate of speed and moving the extension into the path of the brush for intermittent engagement thereby when said vehicle is traveling at a different predetermined rate of speed.

3. In a speed responsive signal, a shaft, a member, means for slidably and non-rotatively connecting said member and shaft, said member including a conducting ring having an axially extending projection, centrifugally operated means connected to said shaft and member to move the latter along the shaft and a stationary contact bearing on said member and contacting with said ring or said projection in accordance with the position of said member, a lamp, a circuit including said lamp and said member.

4. In a speed responsive signal, a signal, operating means therefor including a shaft, means for rotatively mounting said shaft, a member, means for slidably and non-rotatively connecting said member and shaft, said member including a ring portion concentric with said shaft and an axially extending portion, centrifugally operated means connected to said shaft and member to move the latter along the shaft, and a stationary member bearing on said first named member so that when said ring and operating means are opposite each other a continuous signal is given, and when said projection and operating means are opposite each other an intermittent signal is given.

In testimony whereof, I have hereunto signed my name.

FRANK S. WATTELLS.